United States Patent Office 3,558,238
Patented Jan. 26, 1971

3,558,238
CENTRIFUGAL PUMPS
Cornelis H. J. van Herpt, Stiphout, Netherlands, assignor to N.V. Koninklijke Nederlandsche Machinefabriek voorheen E. H. Begemann, Helmond, Netherlands
Filed Oct. 7, 1968, Ser. No. 765,318
Claims priority, application Netherlands, Oct. 6, 1967, 6713596
Int. Cl. F02f 11/00; F04d 29/00
U.S. Cl. 415—169                                          7 Claims

ABSTRACT OF THE DISCLOSURE

A centrifugal pump having a ring with thread of screw in the slit between the wall of the pump housing and the hub of the impeller. The depth of the recesses formed by the thread increasing from the rear side of the impeller into the direction of the end of the hub of the impeller for a ring being provided in the wall of the pump house and decreasing if the ring is provided on the hub.

---

The invention relates to a centrifugal pump.

In using centrifugal pumps for pumping whether or not aggressive suspensions serious difficulties are often encountered owing to corrosion of one of the two cooperating gliding ring sealing surfaces in these pumps. It has been found that even on applying sealing liquids, which are supplied to the bridge slit between a stationary outer sliding ring and a sliding ring rotating with the shaft of the pump, in the event of suspensions containing for instance carbon particles after a short time already a large quantity of carbon particles land in the sealing liquid. These particles appear to be taken along outwardly along the surface of the rotating sliding ring. Obviously the corrosion and attack of pump parts will be still more serious without using sealing liquid.

It has moreover been found that solid particles from the liquid, that is to say in case of a pumped suspension, easily settle in the groove in these pumps in which is accommodated a sealing ring for the connection of the inner sliding ring with the rotor of the pump. Deposits of solids in this groove result namely in that axial movements are no longer possible which gives rise to an increased wear of the surfaces of the cooperating sliding rings. As a consequence it is often necessary in practice to replace the sliding rings after some hours.

It is now an object of the invention to provide a pump in which these difficulties are not encountered so that although aggressive suspensions are pumped the sliding rings need not faster be replaced than on pumping normal clear liquid. This object is attained according to the invention that the pump comprises a pumphousing, a rotating impeller, a pump shaft for driving said shaft, sealing means, a slit between the wall of inside axially elongated portion of the hub of the rotating impeller and the opposite inner wall of the pump housing extending about parallel to that wall tapers and is bent, at its inner end with the smaller diameter, in the direction of the pump shaft and where a bridge slit between a sliding ring seal is situated, and solids separating and returning means in said slit between the wall of the inside axially elongated part of the hub of the impeller and the opposite wall of the pump housing.

According to a preferred embodiment these solids separating and returning means consist of a ring with thread of screw provided in the inner wall of the pump housing whereby the deepest recess of the thread of screw in the ring is situated on the side of the space behind the hub and the smallest recess of the thread of screw in the ring is situated on the side of the impeller.

Such an embodiment used for suspensions containing heavier particles than the suspension liquid is advantageous in that due to the rotary motion of the impeller the suspension or liquid between the elongated part of the hub of the fan and the inner wall of the pump housing is subjected to a centrifugal action, the thread of screw provided in the ring ensuring that the solid particles move in the direction of the impeller. In this way the particles are efficiently prevented from settling in the space behind the impeller, the sealing slit between the sliding ring seal, respectively. In case of suspensions containing lighter particles than the liquid the ring is provided on the elongated part of the hub, whereby the deepest recess is on the side of the impeller and the smallest recess on the side of the space 12.

According to an embodiment of the invention a second ring with thread of screw with substantially identical pitch is disposed on the elongated part of the hub in addition to the ring in the inner wall of the pump housing or in the inner wall in addition to the ring on the elongated part, and being preferably situated in front of the first ring and having a screw of thread such that the smalles recess of the second ring is opposite the deepest recess in the first ring and the deepest recess in the second ring being opposite the smallest recess in the first ring.

For a proper effect the size of the recesses in the thread of screw and the number of threads of screw are conveniently related to the surface tension and the viscosity of the liquid, the angle of inclination of the inner wall of the pump housing, the number of revolutions of the hub and/of the width of slit between the inner wall of the pump housing and the elongated part of the fan.

The invention will be clarified with reference to the drawing in which an embodiment of the device according to the invention is represented. In the drawing:

FIG. 3 is a pump seal according to the invention, both a ring with thread of screw in the inner wall of the housing and a second ring in the elongated part of the hub being provided.

Figure 1:
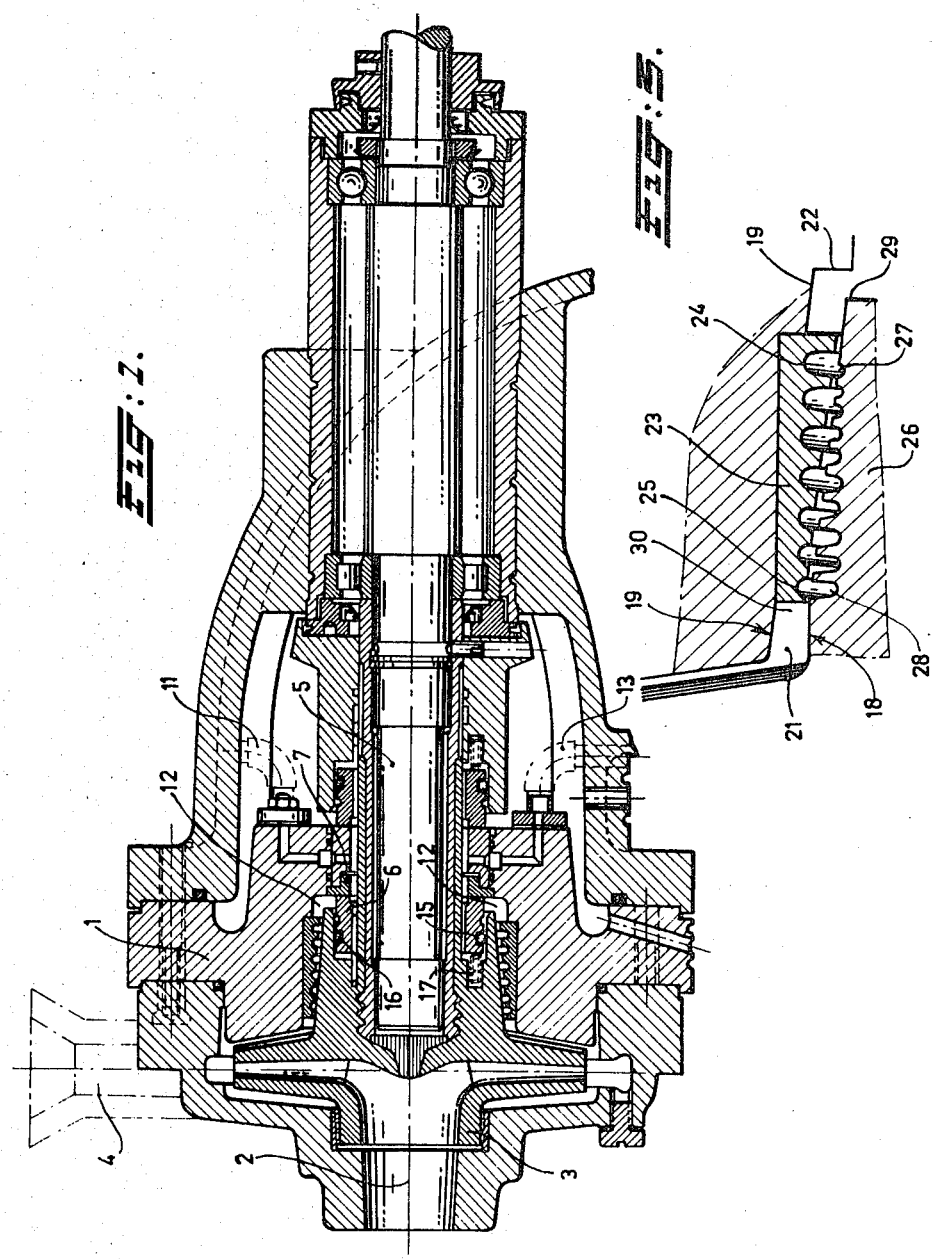
FIG. 1 is a section through a pump with a seal according to the invention.
Figure 2:
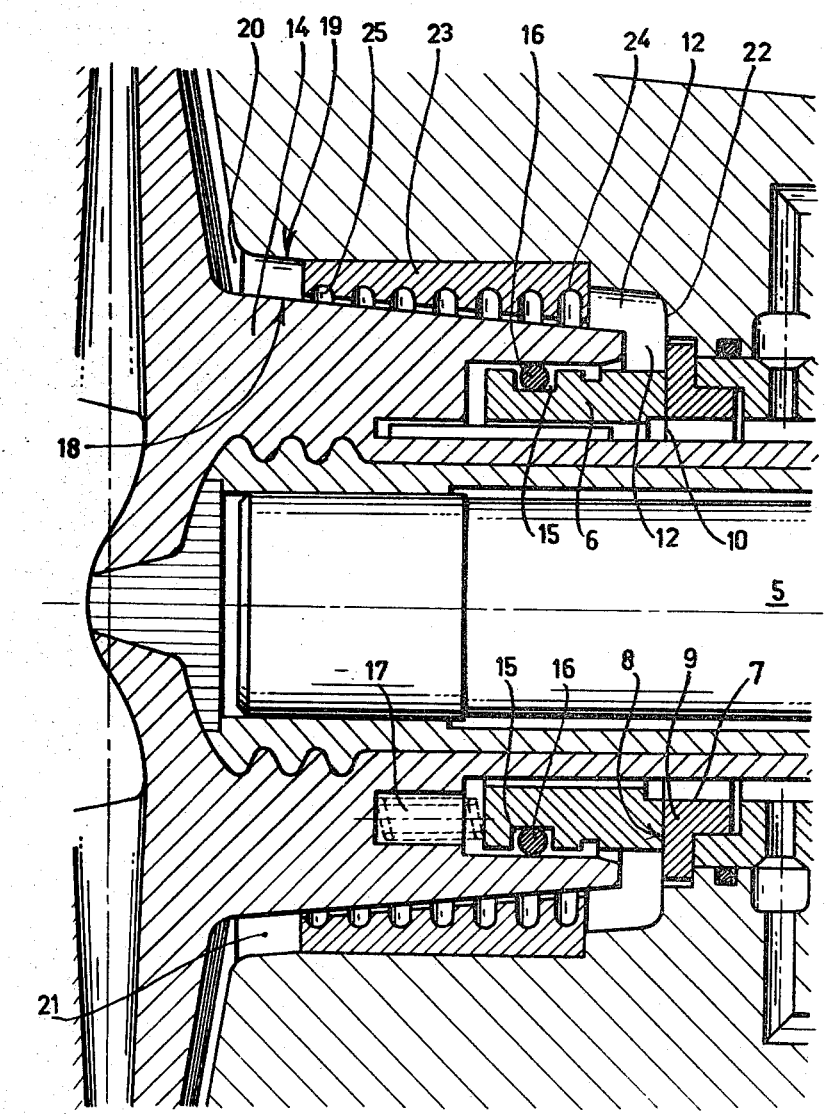
FIG. 2 is to an enlarged scale a pump according to FIG. 1 with a seal according to the invention.

Represented in FIG. 1 is a pump with a pump housing 1 and an axial inlet 2 for the suspension to be pumped. An impeller 3 is provided for conveying the liquid to be pumped via an outlet 4. The split between rear side of impeller and housing may vary between 2 mm. and 10 mm. The impeller 3 is fixedly secured to a pump shaft 5, and has a closed back supporting main pumping vanes which communicate with the inlet 2. This pump shaft 5 carries a sliding ring 6 turning along with the pump shaft, while a stationary sliding ring 7 is provided in the pump housing. Between the cooperating surfaces 8 and 9 of the turning along inner sliding ring, stationary outer sliding ring, respectively, is a bridge slit 10. Via the inlet 11 sealing liquid such as water can be supplied to the bridge slit 10 at the pressure which exceeds the pressure in the space 12 about 10–30% more. The pressure in space 12 depends on the rotation speed but generally the pressure difference between the rear side of the impeller and the space 12 is 2 m. water column.

The outlet for the sealing liquid is denoted by 13. The portion 14 of the impeller 3 situated on the side of the bridge slit has an axial recess in which an inner sliding ring 6 turning along with the shaft is accommodated. In order to prevent the pump liquid from contacting the shaft or other metal parts the inner sliding ring is provided with a groove in which is situated a sealing ring 16. Springs 17 are provided ensuring the superficial pressure of the inner sliding ring 6 on the stationary sliding ring 7.

This centrifugal pump known per se has a slit 21 formed by the tapering inner wall 19 of the pump housing and the outer wall of the axially elongated hub 18 of the impeller. The angle of inclination may vary between 5° and 50°. The inner wall 19 of the pump housing is, at its end, bent in a direction about perpendicular to the pump shaft, at which location 22 is also situated the bridge slit 10 which is in between the sliding ring sealing.

Screwed into the inner wall 19 is a ring 23 serving as a solids separating and returning means. This ring is provided with a thread of screw, the depth of the recesses of said screw thread varies continuously and the deepest recess 24 of the thread of screw is situated on the side of the space 12 behind the hub, while the smallest recess 25 of the thread of screw is situated on the side of the fan. This embodiment is particularly useful for pumping suspension containing heavier particles than the liquid.

According to another embodiment a second ring 26 with thread of screw is provided in the elongated portion 14 opposite the first ring in the wall of the housing of the fan, the smallest recess 27 of this ring being on the side of the space 12 and the deepest recess 28 on the side of the impeller. The pitch of the thread screw of both rings is similar.

The deepest points of the recesses formed by the threads of screw in the rings are on a cylindrical surface, the outer surface of the ring opposite the portion 18 forming part of a cone, which also holds for the outer side of ring 26.

If the suspension to be pumped contains lighter particles than the dispersion liquid, I use only the ring 26 in the elongated part having its smallest recess on the side of space 12 and the deepest recess 28 on the side of the impeller.

The device operates as follows. When the impeller is rotating more turbulent streams are produced in the slit 21 which give rise to a considerable wear especially of the corner part constituting the junction between the wall part 19 and the wall part 22, and of the sliding ring portion which communicates with the space 12, and of the angular point portion 29 of the impeller part which communicates with the space 12. Moreover it has been found that solid particles like carbon particles easily settle in the groove 15 whereby an axial blocking of the sealing ring 16 is produced. On using the ring 23 with thread of screw the centrifugal action of the shaft exerts a centrifugal force on the solid particles which move into the thread of screw of the ring. As a consequence of the return flow of the liquid into the slit 21, simultaneously caused by the centrifugal action, the solid particles together with the liquid are conveyed through the thread of screw in the direction of the impeller, so that the solid particles no longer enter the space 12 where they could provoke wear and tear.

Due to the aforementioned separation of the solid particles and the provision of the ring 23, causing a narrowing of the slit 21, the liquid stream in the part 30 of the slit 21 is also reversed.

In order to obtain good results with suspensions containing lighter particles than the suspension liquid the first ring is provided on the elongation of the hub, the deepest recess being on the side of the fan and the lowest recess on the side of space 12. The second is now situated in the wall of the housing and having the deepest recess on the side of space 12 and the lowest recess on the side of the fan.

It is obvious that the efficiency of the separation is promoted according to the number of threads of screw, but other factors like the viscosity of the liquid, the number of revolutions of the fan, the angle of inclination of the wall portion 19, the width of the slit and the surface tension of the liquid play an important part.

An increase of the conicity of the cone formed by the outer surface of the ring opposite the elongated portion of the hub may provoke a better return of heavier particles.

The advantages of the invention may be shown as follows.

In a first experiment a pump is used having a rotation speed of the impeller 2950 t.p.m., a slit width between hub and wall of the pump housing of 8 mm. the inclination of the hub being 5°, length of the hub behind the impeller 65 mm.

In a second experiment I use the same pump but now having a ring of 44 mm. length in the wall of the pump housing. The ring is 10 mm. from the rear side of the impeller, and present a screw of thread with a pitch of 6 mm.

The smallest recess is 0.5 mm. deep and the deepest recess is 8 mm. deep. The deepest points of all recesses are on a cylinder surface. The clearance between the outside of the ring and the hub amounts to 0.5 mm., but values of 5 mm. and more also provide good results.

The experiments are performed with a suspension containing sea-sand particles. The results obtained are as follows:

| Grams of solids[1] | Grams of solids in space 12 | |
|---|---|---|
| | Without ring | With ring |
| 10 | 4 | 0.3 |
| 20.6 | 8 | 0.1 |
| 41.6 | 9 | 0.4 |

[1] Behind the impeller.

An increase of the angle of 5° to 10° provides an improvement of 15%.

Having thus described the invention and manner of its operation what I claim as my invention is:

1. A centrifugal pump comprising a pump housing having an axial inlet and an outlet, an impeller having a closed back within said housing, said back supporting main pumping vanes communicating with said inlet, a seal between said housing and a rotating part of the pump, said impeller having an elongated hub extending from said back on the side of said impeller away from said inlet, said hub tapering in a direction away from said inlet, a shaft for rotating said impeller, and a stationary ring carried by said pump housing and surrounding said impeller hub, the surface of said ring facing said impeller hub being tapered so that it extends substantially parallel to the exterior surface of said hub, said ring surface being formed with a screw thread, the depth of the recesses of said screw thread continuously varying, the deepest screw thread recess being farthest from said inlet and the shallowest screw thread recess being closest to said inlet, whereby said screw thread moves any solids in the fluid being pumped away from said seal.

2. A centrifugal pump as defined in claim 1 wherein the deepest points of said screw thread recesses are located on an imaginary cylindrical surface.

3. A centrifugal pump comprising a pump housing, an impeller within said housing, said impeller having an elongated hub having a free end surface, said housing having a wall surrounding said hub, a shaft for rotating said impeller, and means between said impeller hub and said surrounding housing wall for moving solid particles in the liquid being pumped in the direction of said impeller and away from the free end surface of said impeller hub, said means comprising a ring surrounding and rotatable with said impeller hub, said ring being formed on its surface facnig said pump housing with a screw thread, the depth of the recesses of said screw thread varying, the deepest screw thread recess being closest to said impeller and the shallowest screw thread recess being closest to the free ends of said hub.

4. A centrifugal pump as defined in claim 3 wherein the portion of said pump housing surface surrounding said impeller hub tapers toward the free end of said hub, and said ring surface facing said pump housing surface is similarly tapered so that it extends substantially parallel to said pump housing surface.

5. A centrifugal pump as defined in claim 4 wherein the deepest points of said screw thread recesses are located on an imaginary cylindrical surface.

6. A centrifugal pump comprising a pump housing, an impeller within said housing, said impeller having an elongated hub, said housing having a wall surrounding said hub, a shaft for rotating said impeller, and means between said impeller hub and said surrounding housing wall for moving solid particles in the liquid being pumped in the direction of said impeller and away from the free end of said impeller hub, said means comprising a stationary ring carried by said pump housing and surrounding said impeller hub, and a movable ring carried by said impeller hub, said rings having opposed relatively movable surfaces, said ring surfaces each being formed with a screw thread, the depth of the recesses of each of said screw threads varying, the deepest recess of said stationary ring screw thread being closest to the free end of said hub and the shallowest recess of said stationary ring screw thread being closest to said impeller, and the deepest recess of said movable ring screw thread being closest to said impeller and the shallowest recess of said movable ring screw thread being closest to the free end of said hub.

7. A centrifugal pump as defined in claim 6 wherein the deepest points of the recesses of each of said screw threads are located on an imaginary cylindrical surface, said cylindrical surfaces being coaxial.

References Cited

UNITED STATES PATENTS

| 835,836 | 11/1906 | Schulz | 103—111 |
|---|---|---|---|
| 963,593 | 7/1910 | Legros | 103—111 |
| 1,810,083 | 6/1931 | Norinder | 103—84 |
| 3,273,906 | 9/1966 | Pennington | 103—111 |
| 897,189 | 8/1908 | Belluzzo | 277—56 |
| 3,031,197 | 4/1962 | Wilkinson | 277—65 |
| 3,081,095 | 3/1963 | Hamrick | 103—111 |
| 2,245,281 | 6/1941 | Klopak | 277—56 |

FOREIGN PATENTS

| 35,965 | 1/1909 | Austria | 415—169 |
|---|---|---|---|
| 15,487 | 1912 | Great Britain | 103—111 |
| 312,362 | 12/1955 | Switzerland | 415—169 |
| 1,178,265 | 9/1964 | Germany | 277—53 |

HENRY F. RADUAZO, Primary Examiner

U.S. Cl. X.R.

277—53, 56